(12) United States Patent
Kato et al.

(10) Patent No.: US 8,697,224 B2
(45) Date of Patent: Apr. 15, 2014

(54) VEHICLE UPHOLSTERY MEMBER

(75) Inventors: Keisuke Kato, Saitama (JP); Mie Kobayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 141 days.

(21) Appl. No.: 13/318,659

(22) PCT Filed: Apr. 22, 2010

(86) PCT No.: PCT/JP2010/002923
§ 371 (c)(1),
(2), (4) Date: Nov. 3, 2011

(87) PCT Pub. No.: WO2010/128581
PCT Pub. Date: Nov. 11, 2010

(65) Prior Publication Data
US 2012/0052243 A1   Mar. 1, 2012

(30) Foreign Application Priority Data

May 7, 2009 (JP) ................................. 2009-112908

(51) Int. Cl.
*B32B 3/00* (2006.01)
*B32B 3/02* (2006.01)
*B60R 13/02* (2006.01)
*B32B 3/30* (2006.01)

(52) U.S. Cl.
CPC ..................................... *B60R 13/02* (2013.01)
USPC ............. 428/141; 428/31; 428/151; 428/156; 428/167; 296/1.08; 296/39.1; 296/146.7; 15/215; 15/216; 15/238; 52/177; 52/179

(58) Field of Classification Search
CPC ............................................... B60R 2013/0281
USPC ............. 296/1.08; 15/215, 216, 238; 52/177, 52/179
See application file for complete search history.

(56) References Cited

U.S. PATENT DOCUMENTS

| | | | |
|---|---|---|---|
| 6,261,666 B1 * | 7/2001 | Enderby et al. | 428/172 |
| 6,539,681 B1 * | 4/2003 | Siegmund | 52/403.1 |
| 6,555,216 B2 * | 4/2003 | Chen et al. | 428/322.7 |

(Continued)

FOREIGN PATENT DOCUMENTS

| | | |
|---|---|---|
| JP | 58-185382 A | 10/1983 |
| JP | 4-041231 A | 2/1992 |

(Continued)

OTHER PUBLICATIONS

Arino et al., Effect of Gloss and Texture on the Color of Injection-Molded Pigmented Plastics, Polymer Engineering and Science, 2005, p. 733-744. NPL_Arino.*

*Primary Examiner* — Aaron Austin
*Assistant Examiner* — Zheren J Yang
(74) *Attorney, Agent, or Firm* — Carrier Blackman & Associates, P.C.; William D. Blackman; Joseph P. Carrier (57) ABSTRACT

An ornamental structure for a vehicle upholstery member provides a plurality of surface patterns by using a single vehicle upholstery member. On the surface of an embossed vehicle upholstery member are arranged a first region formed with a first emboss pattern, a second region spaced from the first region and formed with a second emboss pattern different from the first emboss pattern, and a third region located between the first and second regions and formed with a third emboss pattern which changes progressively from the first emboss pattern to the second emboss pattern as one moves from the first region to the second region.

5 Claims, 12 Drawing Sheets

(56) References Cited

U.S. PATENT DOCUMENTS

| | | | |
|---|---|---|---|
| 7,159,914 B2 * | 1/2007 | Svenson | 296/1.08 |
| 7,332,210 B2 * | 2/2008 | Arms et al. | 428/195.1 |
| 2005/0225113 A1 * | 10/2005 | Svenson | 296/39.1 |
| 2006/0024476 A1 * | 2/2006 | Leland et al. | 428/137 |
| 2007/0275213 A1 | 11/2007 | Shimizu | |

FOREIGN PATENT DOCUMENTS

| | | |
|---|---|---|
| JP | 5-89099 U | 12/1993 |
| JP | 2001-270393 A | 10/2001 |
| JP | 2003-048221 A | 2/2003 |
| JP | 2007-106240 A | 4/2007 |
| JP | 2007-314909 A | 12/2007 |

* cited by examiner

VEHICLE UPHOLSTERY MEMBER

TECHNICAL FIELD

The present invention relates to an upholstery member for four-wheel vehicles (vehicles), and in particular to an ornamental structure for a vehicle upholstery member.

BACKGROUND OF THE INVENTION

The upholstery member used in the instrument panel of a vehicle is required to be provided with favorable utilitarian attributes, such as ease of assembly work and high durability but also attractive appearance. It is known to texture or emboss the surface of the vehicle upholstery member, and also to impart the appearance of natural leather to the vehicle upholstery member. See Patent document 1.

PRIOR ART DOCUMENT(S)

Patent Document(s)

Patent document 1: JP 2007-314909A

BRIEF SUMMARY OF THE INVENTION

Task to be Accomplished by the Invention

As disclosed in Patent document 1, conventionally, the emboss that was applied to a vehicle upholstery member consisted of a single pattern, and a plurality of upholstery members were required in order to combine a plurality of emboss patterns. For instance, if a part of an instrument panel is to be given with a wood grain emboss or woven carbon fiber emboss while the remaining part of the instrument panel is generally to be given with a natural leather emboss, a separate panel given with a wood grain emboss or woven carbon fiber emboss was fitted into the natural leather embossed instrument panel. However, such a structure increases the required number of component parts and the amount of the assembly work so that the work efficiency is impaired. Furthermore, the boundary between the two component parts may detract from the appearance of the instrument panel.

The present invention was made in view of such problems of the prior art, and has a primary object to provide an ornamental structure of a vehicle upholstery member that can combine a plurality of different surface emboss patterns, where such patterns may be characterized by different geometrical patterns, material appearances, colors, glossiness patterns, etc. in a single upholstery member.

Means of Accomplishing the Task

The present invention provides an embossed vehicle upholstery member, including: a first region formed with a first emboss pattern; a second region spaced from the first region and formed with a second emboss pattern different from the first emboss pattern; and a third region located between the first and second regions and formed with a third emboss pattern which changes progressively from the first emboss pattern to the second emboss pattern as one moves from the first region to the second region.

According to this structure, at least two different emboss patterns may be provided on a single vehicle upholstery member so that a combination of a plurality of geometrical patterns, material appearances, colors, glossiness patterns, etc. can be achieved by using a single component, and the production efficiency can be improved owing to the reduced number of component parts and the reduced amount of assembly work. Also, the emboss pattern may be changed gradually without any visible discontinuity so that the ornamental effect may be enhanced. The emboss pattern may be characterized by the arrangement of surface irregularities, glossy finish and coloring.

According to a certain aspect of the present invention, the first emboss pattern includes a surface irregularity of a first configuration and the second emboss pattern includes a surface irregularity of a second configuration.

Thereby, at least two different patterns may be incorporated into a single vehicle component part. As the pattern changes gradually or progressively from one end to another, there is no discontinuity that may detract from the ornamental effect of the pattern.

According to another aspect of the present invention, the first emboss pattern and second emboss pattern include a plurality of projections, and a prescribed area extending downward from a top of each projection is given with a glossy finish or matter finish while an area below the prescribed area is given with a matte finish when the prescribed area is given with a glossy finish or a glossy finish when the prescribed area is given with a matte finish, and wherein the prescribed area in the first region is greater in size than the prescribed area in the second region, and the prescribed area in the third region progressively diminishes in size from the first region to the second region.

According to this structure, by strategically distributing the areas of glossy finish between the elevated parts including the tops of the projections and the depression, and progressively varying the ratio of the area of the glossy finish to the area of the non-glossy finish, the variations in the pattern can be achieved without changing the geometrical emboss pattern (the arrangement of the projections and the depression).

According to yet another aspect of the present invention, the first and second emboss patterns include pinholes formed in projections or in a depression of the emboss pattern at a first density and a second density, respectively, the first density being lower than the second density, and the third emboss pattern includes pinholes at a density that progressively increases from the first density to the second density as one moves from the first region to the second region.

By thus varying the areas where the pinholes are formed in the projections or the depression such that the density of the pinholes may be varied from one region to another, the surface pattern may be varied without varying the geometrical emboss pattern.

According to yet another aspect of the present invention, the first emboss pattern and second emboss pattern include a plurality of projections and a depression, and wherein the projections and/or the depression of the first emboss pattern are colored in a first color, and the projections and/or the depression of the second emboss pattern is colored in a second color different from the first color, the color of the third region changing progressively from the first color to the second color as one moves from the first region to the second region.

By thus strategically varying the color of the emboss pattern, the changes in the pattern can be achieved without actually varying the geometrical emboss pattern. According to the present invention, a plurality of patterns may be provided on the surface of an upholstery member by strategically varying the pattern, glossiness, material appearance, color and so on from one region to another.

According to yet another aspect of the present invention, the first emboss pattern and the second emboss pattern to which the surface pattern such as material appearance, glossiness, color and so on is applied are provided with a same geometrical configuration. The third region may extend along a curved surface smoothly connecting two planes of the upholstery member at an angle to each other. By placing such an emboss pattern on a curved surface of a vehicle instrument panel, or a door upholstery surface such as a lower frame of a side window and an armrest, the appearance of the emboss pattern may be varied from the first region to the second region by using a single upholstery member. In particular, when the transitional region is placed on a curved surface, an ornamental effect may be enhanced by changing the appearance of the pattern from one plane to another plane which is at an angle to the one plane without any discontinuity. This also contributes to the improvement in the production efficiency by reducing the number of component parts and reducing the amount of assembly work.

Effect of the Invention

Thus, the present invention provides an ornamental structure of a vehicle upholstery member that can combine a plurality of different surface patterns characterized by the geometrical pattern, appearance of material, color, glossiness and so on in a single upholstery member.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
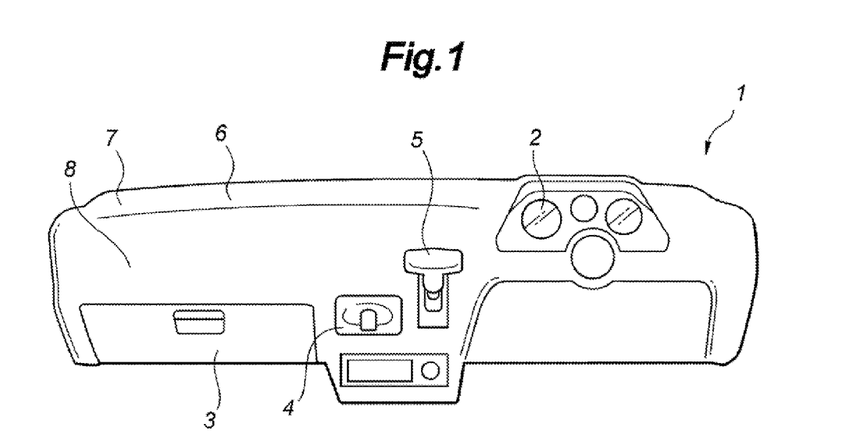
FIG. 1 is a front view of a vehicle instrument panel embodying the present invention as seen from inside the vehicle.

Now the present invention is described in the following by taking an example of an ornamental structure for a vehicle upholstery member with reference to the appended drawings. FIG. 1 is a front view of a vehicle instrument panel 1 embodying the present invention as seen from inside the vehicle, and FIG. 2 is a front view of a vehicle door 10 embodying the present invention as seen from inside the vehicle.

Referring to FIG. 1, the instrument panel 1 is placed in a front part of the passenger compartment of the vehicle, and is fitted with a meter cluster 2, a glove box 3, a storage device 4 and a (transmission) selector lever 5. The instrument panel 1 is covered by an upholstery lining 6 which includes a panel upper part 7 extending horizontally rearward from a windshield (not shown in the drawing) and a panel front part 8 connected to the panel upper part 7 via a smooth curved surface.

Figure 2:
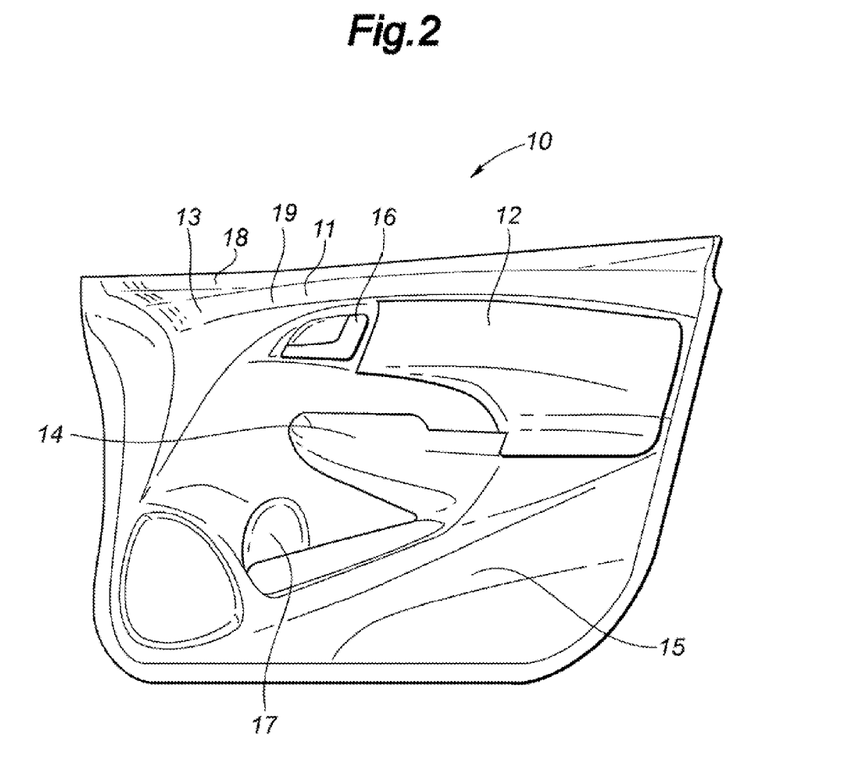
FIG. 2 is a front view of a vehicle door embodying the present invention as seen from inside the vehicle.

Referring to FIG. 2, the vehicle door 10 is covered by a door upholstery lining 11 which is contoured or provided with openings so that a door grip, a loudspeaker, a power window switch and a storage pocket may be formed or fitted in the door 10. The door upholstery lining 11 includes three bulges 13, 14 and 15 (bulging toward the passenger compartment) formed in an upper part adjacent to a side window (not shown in the drawing), an intermediate part and a lower part, respectively, and each having a certain width and extending in a fore and aft direction. The upper bulge 13 is fitted with a door handle 16 for opening the door 10. An armrest 12 made of a separate member is mounted in a part of the door extending from the upper bulge 13 to the intermediate bulge 14, and is also covered by the door upholstery lining 11. The lower bulge 15 defines a recess serving as a storage pocket 17.

The upper bulge 13 includes a bulge upper part 18 extending substantially horizontally inboard from the side window (not shown in the drawing) and a bulge front part 19 connected to the bulge upper part 18 via a smooth curved surface. The intermediate and lower bulges 14 and 15 each similarly include a plurality of parts that are connected to one another via smooth curved surfaces. Vehicle upholstery structures are known to make use of many other upholstery members including two or more parts that are connected to one another via smooth curved surfaces similarly as the panel upholstery lining 6 and the door upholstery lining 11.

First Embodiment

Figure 3:
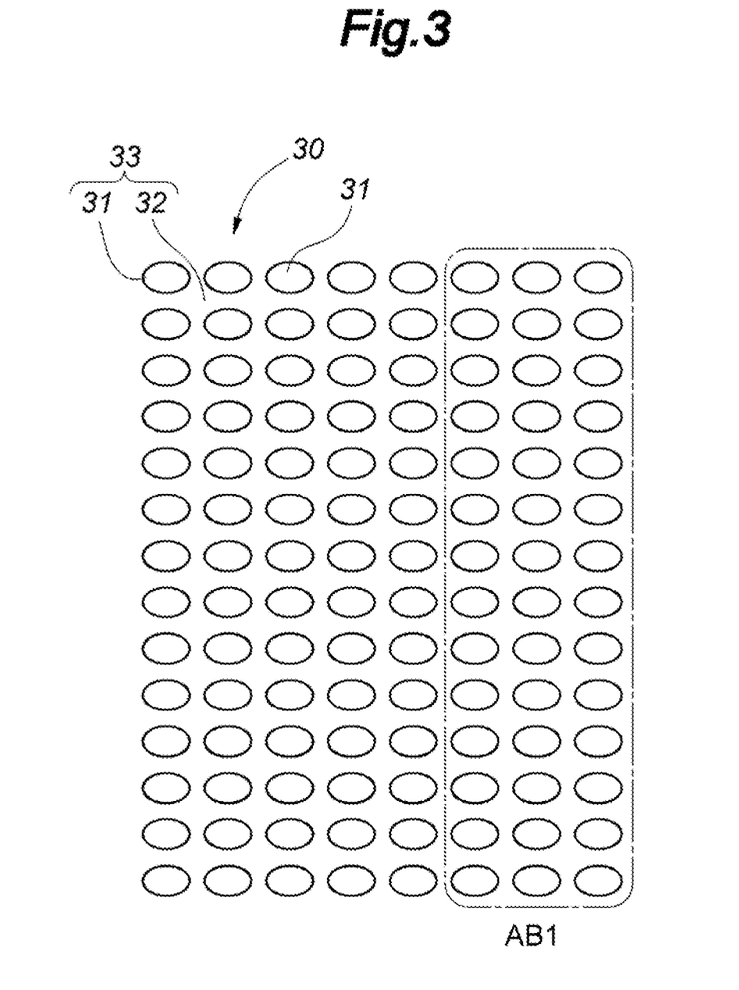
FIG. 3 is a front view showing an exemplary emboss pattern on a first surface region of an upholstery member in a first embodiment of the present invention.
Figure 4:
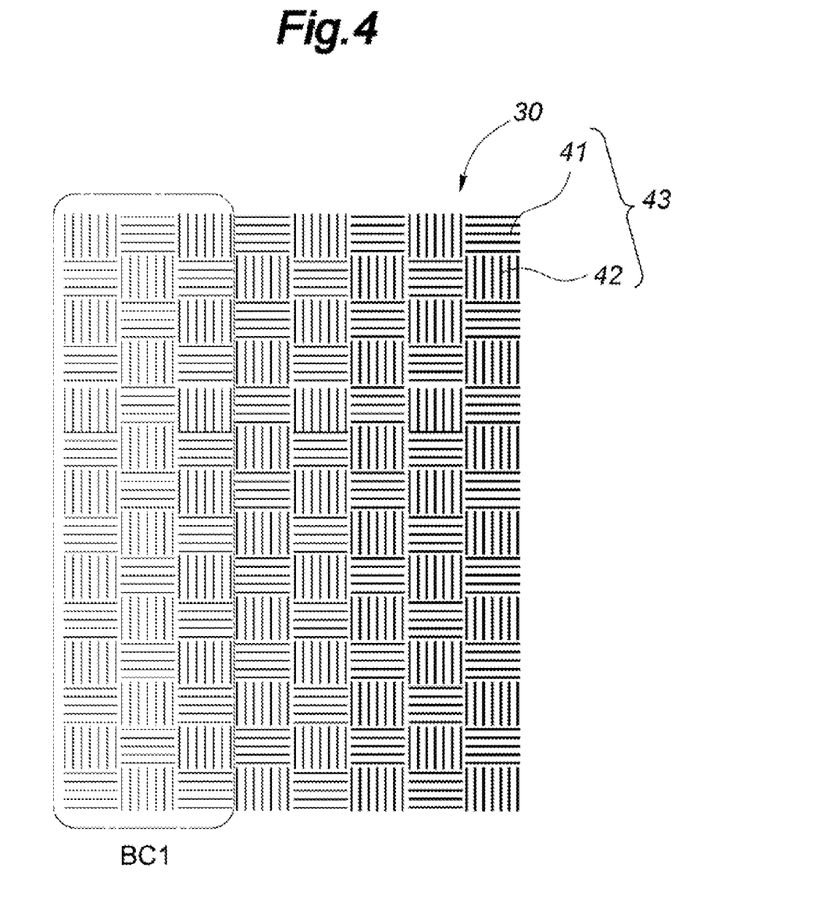
FIG. 4 is a front view showing an exemplary emboss pattern on a second surface region of an upholstery member in the first embodiment of the present invention.
Figure 5:
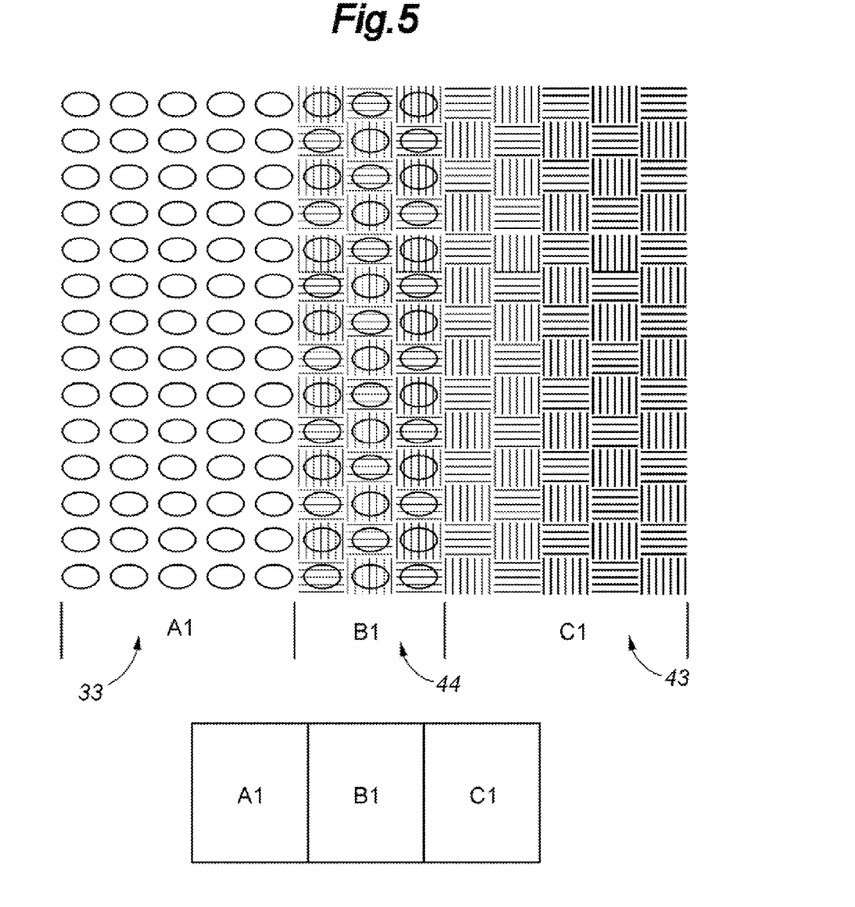
FIG. 5 is a diagram showing the combined emboss pattern on the surface of the upholstery member in the first embodiment.
Figure 6:
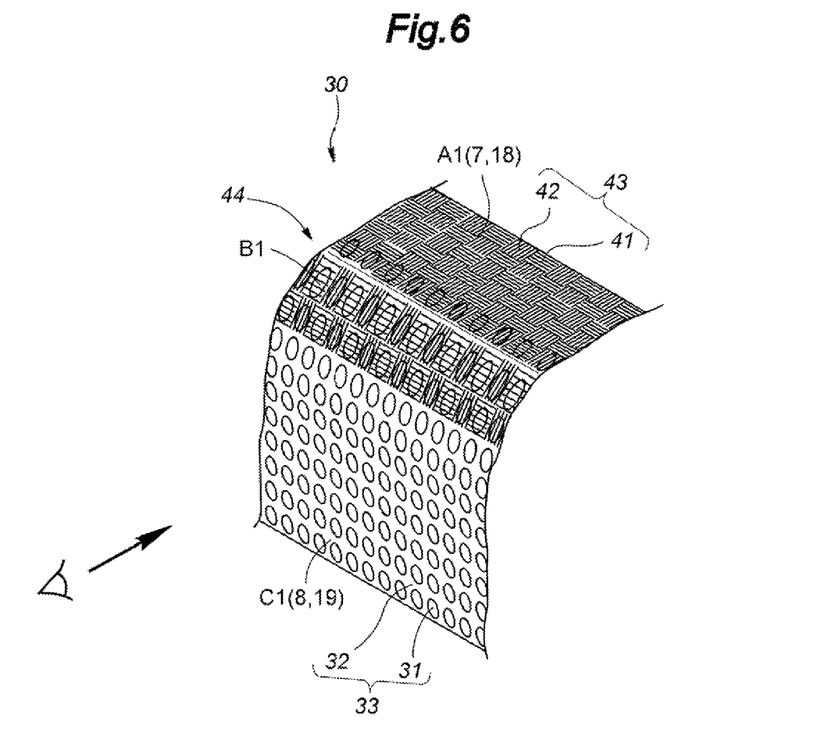
FIG. 6 is a perspective view illustrating the emboss pattern of the first embodiment on a curved surface of the upholstery member in a vehicle.

The structure of the upholstery members (upholstery linings) used in the first embodiment is described in the following with reference to FIGS. 3 to 6. FIGS. 3 and 4 illustrate examples of embossed surface patterns for upholstery members embodying the present invention. FIG. 5 is a diagram illustrating the combined emboss pattern of the first embodiment, and FIG. 6 is a perspective view showing the upholstery member of the first embodiment applied to a curved part of a vehicle.

Referring to FIG. 3, a plurality of substantially elliptic projections 31 are formed on a sheet member (plate member) 30, and the remaining part between the projections 31 consists of a depression (base sheet) 32 or the base surface of the sheet member 30, which may be configured so that an appearance of natural leather may be produced. The embossed sheet member 30, incorporated with a first emboss pattern 33 consisting of the projections 31 and the base sheet 32, may consist of general purpose plastics such as PP (polypropylene), TOP (thermoplastic olefin), etc., and may also consist of a thin sheet member or film. The emboss pattern can be formed by simple embossing, roller embossing or the like. In a region AB1 surrounded by a chain-dot line as shown in FIG. 3, the height of the projections 31 is progressively diminished from left to right in the drawing. The region AB1 surrounded by the chain-dot line contains three columns of projections 31 in FIG. 3, but it is only exemplary, and there may be any desired number of columns of projections 31 in the region AB1. As will be discussed hereinafter, this region AB1 is a part of a transitional or intermediate region B1 (third region, see FIG. 5) connecting one region A1 (first region) with another region C1 (second region).

Referring to FIG. 4, another portion of the same sheet member 30 (formed with the first emboss pattern 30 including the projections 31 and the depression 32 as discussed earlier) is additionally formed with a carbon fiber fabric pattern (second pattern) consisting of a checker pattern of two kinds of blocks 42 and 41 containing a plurality of vertical ridge lines and a plurality of horizontal ridge lines (as seen from the front), respectively. This second emboss pattern 43 shown in FIG. 4 differs from the emboss pattern shown in FIG. 3. The horizontal and vertical ridge lines may also consist of horizontal and vertical groove lines. In a region BC1 surrounded by a chain-dot line as shown in FIG. 4, the height of the horizontal and vertical ridge lines is progressively diminished from right to left in the drawing. This variation in the region BC1 is viewed by the vehicle occupant as a change in the shade gradation of the carbon fiber fabric. The region BC1 surrounded by the chain-dot line contains three columns of blocks 41, 42 and 41 or 42, 41 and 42 in FIG. 4, but it is only exemplary, and there may be any desired number of columns of blocks 41, 42.

In FIG. 5, a region A1 (first region) is provided with the pattern illustrated in FIG. 3 and a region C1 (second region) is provided with the pattern illustrated in FIG. 4 which is different from the pattern of the region A1. A region B1 (intermediate or third region) is provided between these two regions A1 and C1. The region B1 is formed by overlapping or superimposing parts of the region A1 and the region C1 with each other. As discussed earlier, in the region AB1 of the region A1, the natural leather appearance of the first emboss pattern 33 is made progressively thinner from left to right by progressively reducing the height of the projections 31. Similarly, in the region BC1 of the region C1, the carbon fiber fabric appearance of the region C1 is made progressively thinner from right to left in the drawing. This region BC1 is overlapped or superimposed with the region AB1 of FIG. 3 so as to define a region B1 having a transitional or third emboss pattern 44. As a result, the vehicle occupant perceives the pattern to change progressively from the region A1 to the region C1.

Referring to FIG. 6, the transitional region B1 consisting of the third emboss pattern 44 may be placed on the curved surface connecting the region A1 of the first emboss pattern 33 and the region C1 of the second emboss pattern 43 which define two surfaces of the upholstery member at an angle to each other. Based on this structure, in the instrument panel upholstery lining 6 of FIG. 1, the region A1 may be placed on the panel upper part 7 extending horizontally rearward from the front windshield and the region C1 on the panel front part 8 connected to the panel upper part 7 via the smooth curved surface while the region B1 may be placed on the surface connecting the two parts. Similarly, referring to FIG. 2 showing the upper bulge 13, the region A1 may be placed on the bulge upper part 18 extending horizontally inboard from the side window and the region C1 on the bulge front part 19 connected to the bulge upper part 18 via the smooth curved surface while the region B1 may be placed on the surface connecting the two parts.

According to this structure, even though a plurality of patterns are combined, the different patterns may be formed on a single vehicle upholstery member so that the number of component part and the amount of assembly work can be both reduced, and the production efficiency can be improved. As the appearance of the surface pattern can be progressively varied depending on the viewing angle, the ornamental effect can be enhanced. There were only two regions having different patterns in the foregoing embodiment, but a larger number of regions having different patterns may be provided and the corresponding number of transition regions may be provided between the different regions.

Second Embodiment

Figure 7:
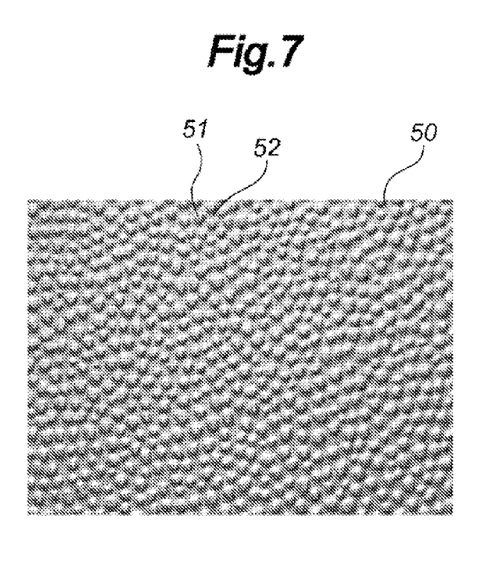
FIG. 7 is a front view showing an exemplary emboss pattern on a surface region of an upholstery member in a second embodiment of the present invention.
Figure 8:
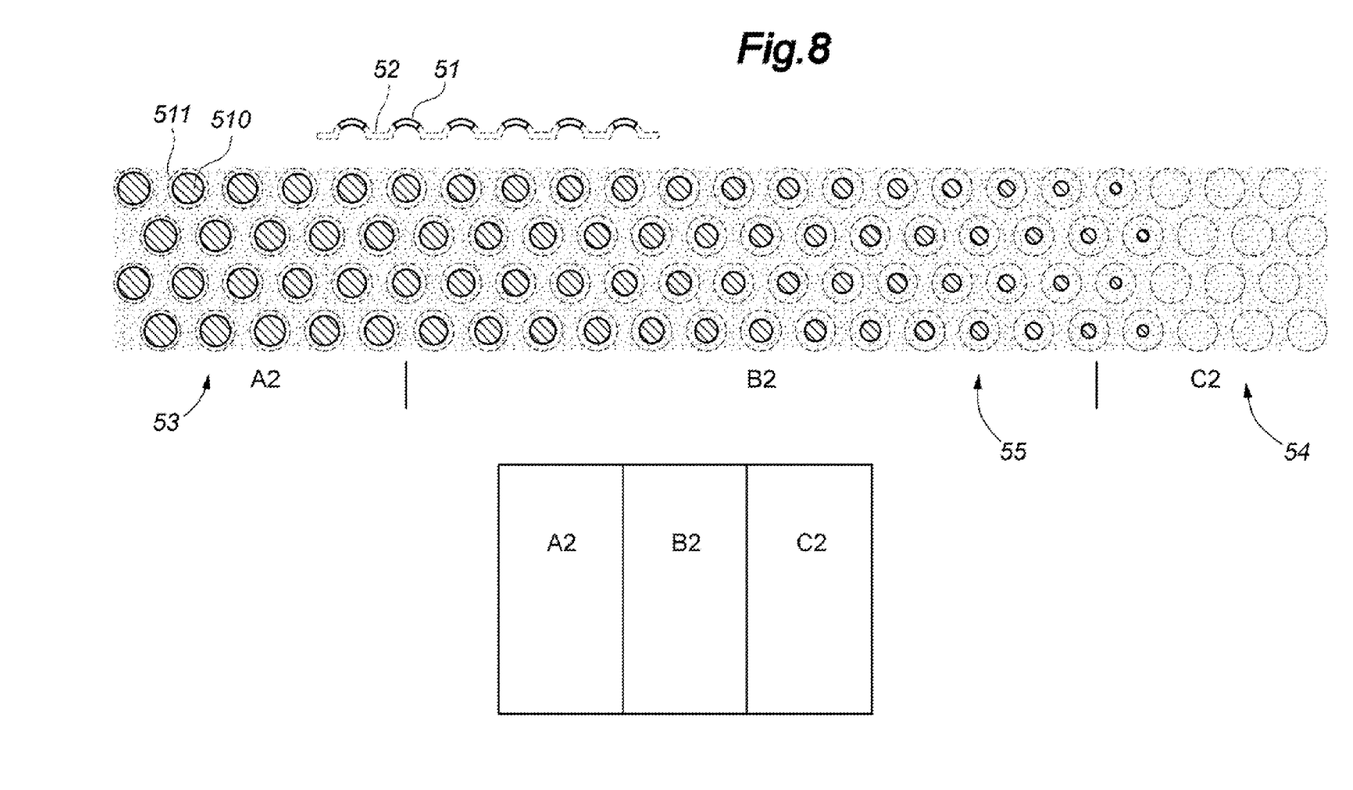
FIG. 8 is a diagram showing the combined emboss pattern on the surface of the upholstery member in the second embodiment.

The structure of the upholstery member (upholstery lining) used in the second embodiment is described in the following with reference to FIGS. 7 and 8. FIG. 7 is a front view showing an exemplary emboss pattern on the surface of the upholstery member of the second embodiment, and FIG. 8 is a diagram illustrating the combined emboss pattern of the second embodiment. Referring to FIG. 7, a plurality of substantially circular projections 51 are formed on a sheet member (plate member) 50, and the remaining part between the projections 51 consists of a depression 52 or the base surface of the sheet member 50. The embossed sheet member 50 may be made of material similar to that of the sheet member 30 of the first embodiment.

Referring to FIGS. 7 and 8, each projection 51 includes a glossy part 510 (hatched region) centered around a top (which is approximately in the center of the projection 51) and extending slightly downward from the top over a prescribed area, and a matte part 511 (indicated by the dotted area) extending downward from the glossy part 510 while the depression 52 generally consists of matte surface. The size of the prescribed area of each projection 51 progressively diminishes from the region A2 (first region) having a first emboss pattern 53 on the left hand side of FIG. 8 to the right hand side of FIG. 8. The region C2 (second region) on the right hand side of FIG. 8 is formed with a second emboss pattern 54 in which the projections 51 and the depression 52 are exclusively provided with matte surface.

Referring to FIG. 8, the region A2 (first region) provided with the first emboss pattern 53 including glossy parts and the region C2 (second region) provided with the second emboss pattern 54 consisting strictly of matte part are placed on either side of a transitional region B2 (third region) provided with a third emboss pattern 55 where the glossiness changes from one side to the other. Thereby, without changing the emboss pattern, the appearance of the surface of the upholstery member can be progressively changed as one moves from the first region to the second region by using a single upholstery member. The pattern of the region C2 may be totally matte by absence of any glossy part.

The area near the top of each projection 51 was given a glossy finish in the foregoing embodiment, but the depression 52 may be given with a glossy finish instead. Similarly as in the case with the first embodiment, the second embodiment is applicable to various other upholstery parts in which a plurality of flat surfaces are connected by smooth curved surfaces as exemplified by the embodiments illustrated in FIGS. 1, 2 and 6, and the region B2 may be placed on such curved surfaces.

Third Embodiment

Figure 9:
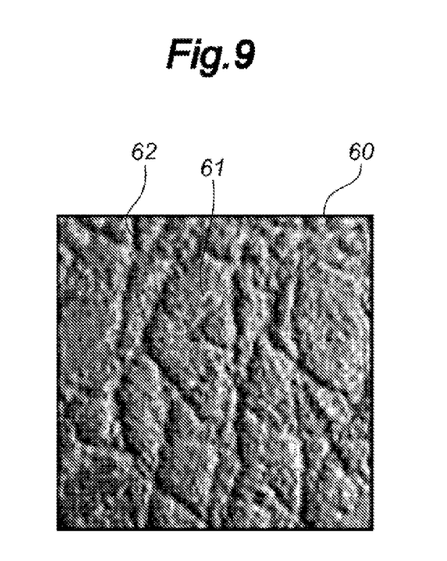
FIG. 9 is a front view showing an exemplary emboss pattern on a surface region of an upholstery member in a third embodiment of the present invention.
Figure 10:
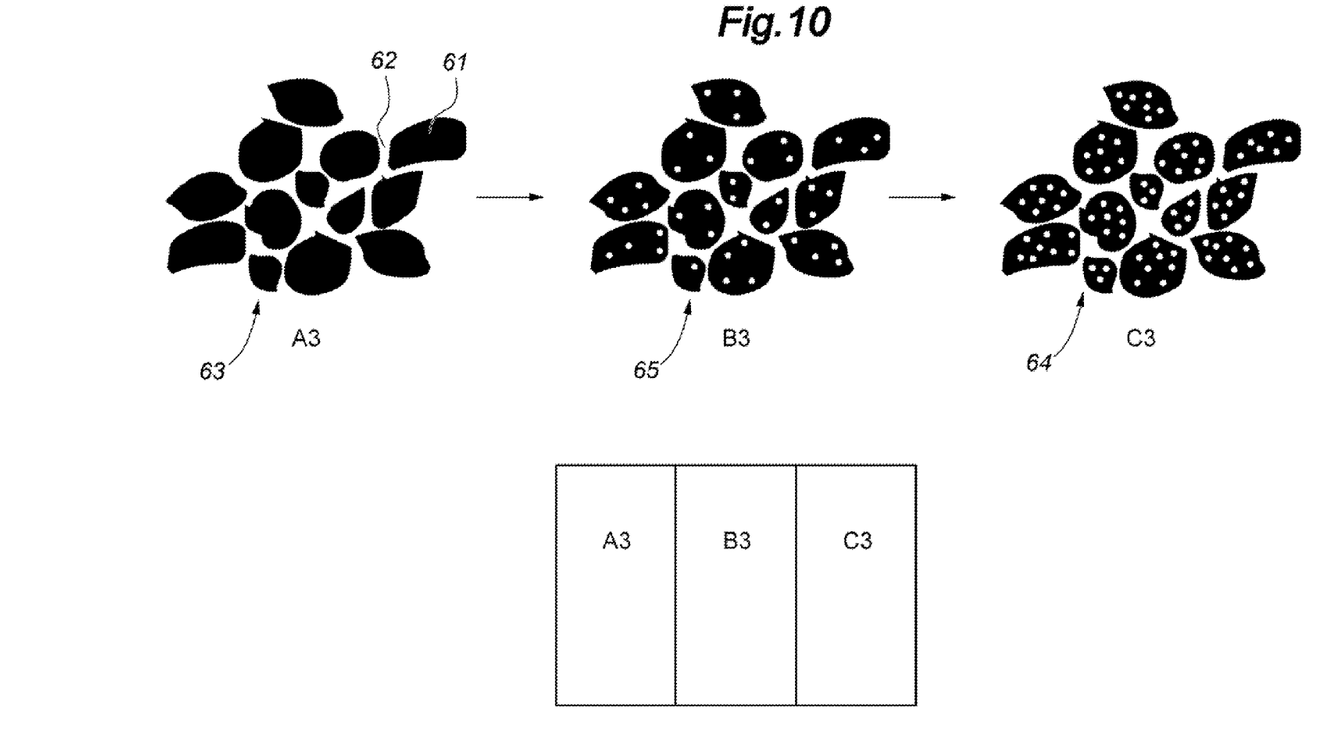
FIG. 10 is a diagram showing the combined emboss pattern on the surface of the upholstery member in the third embodiment.

The third embodiment of the present invention is described in the following with reference to FIGS. 9 and 10. FIG. 9 is a front view showing an exemplary emboss pattern on the surface of the upholstery member of the third embodiment, and FIG. 10 is a diagram illustrating the combined emboss pattern of the third embodiment. The emboss pattern may consist of natural leather patterns, graphic patterns, linear patterns, wood grain patterns, stone grain patterns, fabric emboss patterns and carved letter patterns in addition to the irregular surface pattern consisting of a plurality of substantially circular projections. Referring to FIG. 9, a natural leather pattern somewhat different from the emboss pattern shown in FIG. 3 is used, and a plurality of areas defined by curved lines and having various sizes are arranged. These areas defined by curved lines form projections 61 while the space between the projections 61 consist of a depression 62 or the base surface of the sheet member 60. By thus randomly arranging the areas defined by curved lines, the appearance of natural leather can be achieved. This emboss pattern can be formed by simple embossing, roller embossing or the like. Such upholstery sheet member incorporated with an emboss pattern having the appearance of natural leather is widely used in the upholstery of vehicles, and the material for the sheet member 60 incorporated with the emboss pattern may similar to that of the sheet member of the first embodiment.

It is known to form pin holes on the embossed surface to create a special effect that gives the surface the appearance of certain material. Referring to FIG. 10, the third embodiment includes three regions A3, B3 and C3. The region C3 (second region) is provided with a second emboss pattern 64 consisting of natural leather emboss pattern with pin holes formed in the projections, and the region A3 (first region) is provided with a first emboss pattern 63 without such pin holes. The transitional region B3 placed between these two regions A3 and C3 is provided with a third emboss patterns 65 with pin holes whose density or population increases progressively from the side of the first region A3 to the second region C3. FIG. 10 shows small portions of these regions A3, B3 and C3. Between the regions A3 and B3 and between the regions B3 and C3, the pin holes are provided at a density which progressively increases from one end to the other. The region C3 where the pin holes are formed at a relatively high density presents a highly matte appearance.

The pin holes were formed in the projections 61 in the foregoing embodiment, but may be formed in the depression 62 instead. Similarly as the case with the first embodiment, the third embodiment is applicable to various other upholstery parts in which a plurality of flat surfaces are connected by smooth curved surfaces as exemplified by the embodiments illustrated in FIGS. 1, 2 and 6, and the region B3 may be placed on such curved surfaces.

Fourth Embodiment

Figure 11:
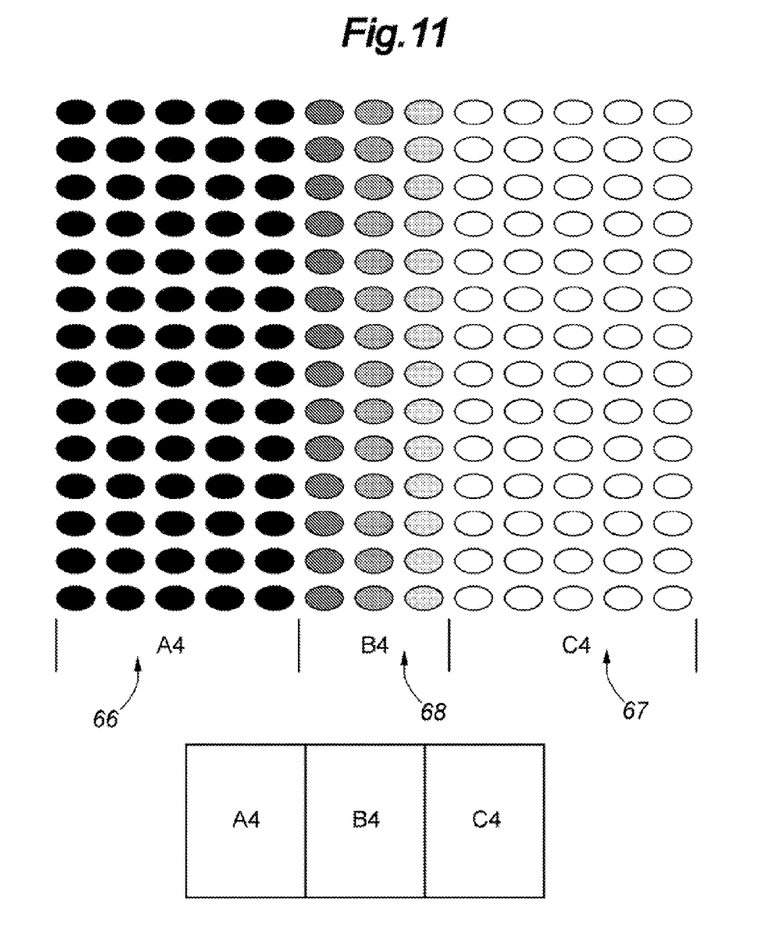
FIG. 11 is a diagram showing the combined emboss pattern on the surface of an upholstery member in a fourth embodiment.
Figure 12:
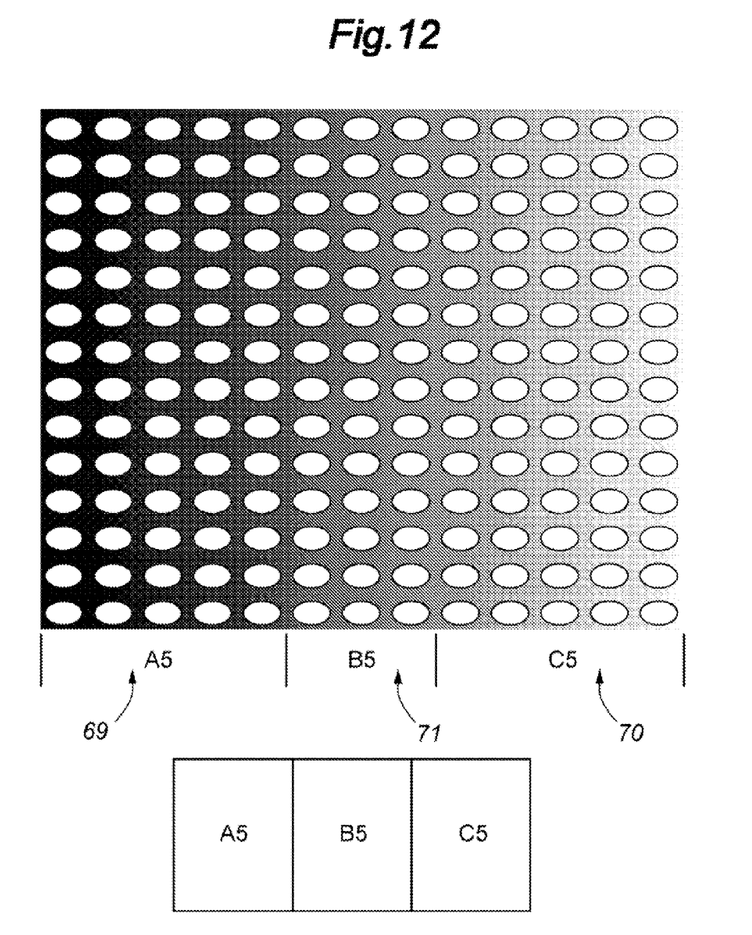
FIG. 12 is a diagram showing the combined emboss pattern on the surface of an upholstery member in a modification of the fourth embodiment

The structure of the upholstery member (upholstery lining) used in the fourth embodiment is described in the following with reference to FIGS. 11 and 12. FIG. 11 is a diagram showing the combined emboss pattern of the fourth embodiment, and a FIG. 12 shows a modification of the fourth embodiment. Referring to FIG. 11, a plurality of substantially elliptic projections are formed on a sheet member similarly as in the region A1 of the first embodiment illustrated in FIG. 3, and the remaining part between the projections consists of a depression or the base surface of the sheet member. The embossed sheet member 50 may consist of material similar to that of the sheet member 30 of the first embodiment.

Referring to FIG. 11, a region A4 (first region) is incorporated with a first emboss pattern 66 in which the projections are generally painted or otherwise colored black, and a region C4 (second region) is incorporated with a second emboss pattern 67 in which the projections are generally painted or otherwise colored white. The depression is painted white in each of the regions. A region B4 (third region) is incorporated with a third emboss pattern 68 which changes in color progressively from the region A4 to the region C4. The region A4 (first region) provided with the first emboss pattern 66 painted predominantly in black color (first color) and the region C4 (second region) provided with the second emboss pattern 67 painted strictly in white color (second color) are placed on either side of the transitional region B4 (third region) provided with the third emboss pattern 68 where the color changes progressively from one side to the other. Thereby, without changing the emboss pattern, the appearance of the surface of the upholstery member can be progressively changed as one moves from the first region to the second region by using a single upholstery member.

Referring to FIG. 12, a region A5 (first region) is incorporated with a first emboss pattern 69 in which the depression is generally painted or otherwise colored black, and a region C5 (second region) is incorporated with a second emboss pattern 70 in which the depression is generally painted or otherwise colored white. The projections are painted white in each of the regions. A region B4 (third region) is incorporated with a third emboss pattern 71 which changes in color progressively from the region A5 to the region C5. The region A5 (first region) provided with the first emboss pattern 69 painted predominantly in black color (first color) and the region C5 (second region) provided with the second emboss pattern 70 painted predominant in white color (second color) are placed on either side of the transitional region B5 (third region) provided with the third emboss pattern 71 where the color changes progressively from one side to the other. Thereby, without changing the emboss pattern, the appearance of the surface of the upholstery member can be progressively changed from the first region to the second region by using a single upholstery member.

The emboss pattern was formed by substantially elliptic projections in the foregoing embodiment, but may also be formed by depressions, and the shape of each projection or depression may be other than elliptic. Only the shade gradation of black and white was used in the foregoing embodiment, but other colors and more colors may be used so that the color phase progressively changes from one region to another. Similarly as the case with the first embodiment, the third embodiment is applicable to various other upholstery parts in which a plurality of flat surfaces are connected by smooth curved surfaces as exemplified by the embodiments illustrated in FIGS. 1, 2 and 6, and the regions B4 and B5 may be placed on such curved surfaces.

Although the present invention has been described in terms of preferred embodiments thereof, it is obvious to a person skilled in the art that various alterations and modifications are possible without departing from the scope of the present invention. For instance, the emboss patterns in the foregoing embodiments consisted of the genuine leather pattern, but other patterns such as various graphic patterns, linear patterns, wood grain patterns, stone grain patterns, fabric emboss patterns and carved letter patterns may be also be applied to the present invention.

GLOSSARY 1 instrument panel
2 meter cluster
3 glove box
4 storage device
5 selector lever
6 panel upholstery lining
7 panel upper part
8 panel front part
10 door
11 door upholstery lining
12 armrest
13, 14, 15 bulge
16 door handle
17 storage pocket
18 bulge upper part
19 bulge front part
30, 50, 60 sheet member
31, 41, 51, 61 projection
32, 42, 52, 62 depression
33, 53, 63, 66, 69 first emboss pattern
43, 54, 64, 67, 70 second emboss pattern
44, 55, 65, 68, 71 third emboss pattern
A1, A2, A3, A4, A5 first region
B1, B2, B3, B4, B5 second region
C1, C2, C3, C4, C5 third region

The invention claimed is:

1. An embossed vehicle upholstery member comprising a base sheet, said vehicle upholstery member including:
   a first region formed with a first emboss pattern, said first region comprising a plurality of first raised projections projecting outwardly from the base sheet to define said first emboss pattern;
   a second region spaced apart from the first region and formed with a second emboss pattern different from the first emboss pattern, said second region comprising a plurality of second raised projections projecting outwardly from the base sheet to define said second emboss pattern; and
   an intermediate region located between the first and second regions and formed with a transitional emboss pattern which changes progressively from the first emboss pattern to the second emboss pattern as one moves from the first region through the intermediate region to the second region, the transitional emboss pattern including both of the first and second emboss patterns superimposed on one another,
   wherein a distance that the first raised projections extend outwardly from the base sheet in the intermediate region decreases progressively from an area of the intermediate region proximate the first region to an area of the intermediate region proximate the second region, and a distance that the second raised projections extend outwardly from the base sheet in the intermediate region decreases progressively from the area of the intermediate region proximate the second region to the area of the intermediate region proximate the first region.

2. The embossed vehicle upholstery member according to claim 1, wherein the first emboss pattern includes a surface irregularity of a first configuration and the second emboss pattern includes a surface irregularity of a second configuration.

3. The embossed vehicle upholstery member according to claim 1, wherein the intermediate region extends along a curved surface smoothly connecting two planes of the upholstery member, said planes oriented at an angle to each other.

4. The embossed vehicle upholstery member according to claim 1, wherein pinholes are formed in one of the projections and the base surface in the first and second regions at a first density and a second density, respectively, the first density being lower than the second density, and wherein pinholes are formed in one of the protrusions and the base surface in the intermediate region at a density that progressively increases from the first density to the second density as one moves from the first region through the intermediate region to the second region.

5. The embossed vehicle upholstery member according to claim 1, wherein one of the projections and the base surface in the first region is colored in a first color, and one of the projections and the base surface in the second region is colored in a second color different from the first color, a color of one of the projections and the base surface in the intermediate region changing progressively from the first color to the second color as one moves from the first region through the intermediate region to the second region.

* * * * *